United States Patent
Roehner et al.

(10) Patent No.: US 12,395,038 B2
(45) Date of Patent: Aug. 19, 2025

(54) ELECTRIC DRIVE UNIT AND VEHICLE COMPRISING A CORRESPONDING ELECTRIC DRIVE UNIT

(71) Applicant: Robert Bosch GmbH, Stuttgart (DE)

(72) Inventors: Marc Oliver Roehner, Heidelberg (DE); Philipp Breinlinger, Karlsruhe (DE); Theresa Sophia Boettinger, Stuttgart (DE)

(73) Assignee: Robert Bosch GmbH, Stuttgart (DE)

( * ) Notice: Subject to any disclaimer, the term of this patent is extended or adjusted under 35 U.S.C. 154(b) by 346 days.

(21) Appl. No.: 18/044,794

(22) PCT Filed: Aug. 4, 2021

(86) PCT No.: PCT/EP2021/071719
§ 371 (c)(1),
(2) Date: Mar. 10, 2023

(87) PCT Pub. No.: WO2022/053232
PCT Pub. Date: Mar. 17, 2022

(65) Prior Publication Data
US 2023/0291269 A1    Sep. 14, 2023

(30) Foreign Application Priority Data
Sep. 11, 2020   (DE) ............... 10 2020 211 432.3

(51) Int. Cl.
*H02K 5/20*     (2006.01)
*H02K 5/10*     (2006.01)
*H02K 7/00*     (2006.01)

(52) U.S. Cl.
CPC ............... *H02K 5/20* (2013.01); *H02K 5/10* (2013.01); *H02K 7/006* (2013.01)

(58) Field of Classification Search
CPC .......... H02K 7/006; H02K 5/203; H02K 5/20; H02K 5/10; B60K 1/00; B60K 2001/006; B60K 11/02; B60Y 2410/10
(Continued)

(56) References Cited

U.S. PATENT DOCUMENTS 5,293,089 A * 3/1994 Frister ................... H02K 5/203
                                                    310/64
5,698,912 A * 12/1997 Rasch ...................... H02K 9/19
                                                    475/161
(Continued)

FOREIGN PATENT DOCUMENTS

DE   102014214724 A1   1/2016
EP      3028888 A1     6/2016
(Continued)

OTHER PUBLICATIONS

Translation of International Search Report for Application No. PCT/EP2021/071719 dated Nov. 10, 2021 (2 pages).

*Primary Examiner* — Alex W Mok
(74) *Attorney, Agent, or Firm* — Michael Best & Friedrich LLP

(57) ABSTRACT

The invention relates to an electric drive unit (10), in particular for a vehicle or motor vehicle, comprising an electric machine (12) and a transmission (14). The electric machine (12) is accommodated in a drive housing (18), and the transmission (14) is accommodated in a transmission housing (20), wherein the interior (19) of the drive housing (18) and the interior (21) of the transmission housing (20) are separated by a bearing wall (22), and at least one cooling channel (24) for cooling the electric machine (12) is formed on or in the drive housing (18). The electric drive unit (10) has an insert (26) which is designed and arranged such that a cavity (28) is produced in the drive housing (18) between the bearing wall (22) and the insert (26), and the cavity (28)

(Continued)

is fluidically connected to the cooling channel (24). The invention also relates to a vehicle comprising a corresponding electric drive unit (10).

13 Claims, 7 Drawing Sheets

(58) Field of Classification Search
USPC .......................................................... 310/52
See application file for complete search history.

(56) References Cited

U.S. PATENT DOCUMENTS

| | | | |
|---|---|---|---|
| 6,300,693 B1* | 10/2001 | Poag | H02K 5/203 |
| | | | 310/58 |
| 8,922,072 B2* | 12/2014 | Bott | H02K 15/14 |
| | | | 310/52 |
| 9,054,565 B2* | 6/2015 | Fulton | H02K 9/19 |
| 10,141,798 B2* | 11/2018 | Rogginger | H02K 1/20 |
| 10,516,320 B2* | 12/2019 | Chamberlin | H02K 9/19 |
| 2009/0102298 A1* | 4/2009 | Savant | H02K 5/203 |
| | | | 310/52 |
| 2018/0123409 A1* | 5/2018 | Rogginger | B02C 23/00 |

FOREIGN PATENT DOCUMENTS

| | | | |
|---|---|---|---|
| JP | 2019062716 A | * | 4/2019 |
| WO | 2014026874 A2 | | 2/2014 |
| WO | 2019240522 A1 | | 12/2019 |
| WO | 2020069744 A1 | | 4/2020 |

* cited by examiner

ELECTRIC DRIVE UNIT AND VEHICLE COMPRISING A CORRESPONDING ELECTRIC DRIVE UNIT

BACKGROUND

The invention relates to an electric drive unit, in particular for a vehicle or motor vehicle, as well as to a vehicle.

An electric axle drive (eAxle) consists substantially of power electronics, an electric machine, and a transmission. In addition to the electric machine, the transmission also generates heat during operation, which must be dissipated as of a certain continuous outlet.

Conventionally, the heat in the transmission is dissipated with a heat exchanger. When the electric machine is cooled with water, the oil in the transmission is not necessarily coupled to a heat exchanger.

DE 10 2014 214 724 A1 discloses an electric machine having a cooling jacket consisting of an inner shell and an outer shell, wherein a cooling chamber configured as an annular gap is arranged between these shells. The inner shell and the outer shell are slid into one another for assembly, wherein the ring gap is sealed at its axial ends by adhesive connections.

SUMMARY

According to the invention, an electric drive unit, in particular for a vehicle or motor vehicle, having an electric machine and a transmission is proposed. The electric machine is accommodated in a drive housing, and the transmission is accommodated in a transmission housing. The drive housing and the transmission housing can be integrally formed or can be formed as separate elements. An interior of the drive housing and an interior of the transmission housing are separated by a bearing wall. On or in (e.g. within) the drive housing(s), at least one cooling channel (e.g. in the form of a cooling jacket) is configured for cooling the electric machine. The electric drive unit comprises an insert designed and arranged so as to create a cavity in the drive housing between the bearing wall and the insert, wherein the cavity is fluidically connected to the cooling channel.

"Fluidically connected" means a connection of two elements (or spaces) via which a fluid (gas, liquid) of an element (or space) can flow into the other and vice versa.

The cavity formed by the insert thus becomes part of the cooling circuit and/or becomes a further cooling channel that cools the bearing wall. A cooling of the transmission via the transmission housing or the bearing wall can thus be realized.

The insert can be inserted/pressed into the housing.

The drive housing and transmission housing can be configured as housing portions that, when assembled, form a housing assembly or a housing. An integral configuration of the housing is also conceivable.

The bearing wall can be formed in an end region of the drive housing facing the transmission housing (the drive housing has a bearing wall). The bearing wall can contain a bearing seat for a roller bearing (e.g. for storing the motor shaft), optionally also a sealing seat for a sealing ring, e.g. a radial shaft sealing ring. The bearing wall is in particular radially oriented (bearing wall arranged orthogonally to the central longitudinal axis of the electric machine or its motor shaft).

The insert can be radially arranged in the drive housing, e.g. as a radially oriented insert washer.

The electric drive unit can serve as an electric drive unit for a vehicle or motor vehicle, for example in the form of an electrical axis ("eAxle"). An application in mechanical engineering is also conceivable, for example as a power unit for a machine tool.

According to a further development, the insert can be configured such that the cavity extends over the entire surface of the bearing wall facing the drive housing. The entire bearing wall can thus be cooled. The cooling of the bearing wall or the transmission housing or the transmission can be optimized. Only the region of the bearing seat and/or the sealing seat can be left unoccupied. The cavity can be circularly annular, for example.

According to a further development, the cavity can be fluidically connected to the cooling channel by way of at least one channel. The channel can be formed by two intersecting passages, for example. A respective end of a passage can be fluidically sealed/closed by means of a sealing plug. Thus, no (additional) tubing is necessary. The passages can be produced by drilling/milling.

Of course, it is also conceivable to realize the fluid connection between the cavity and the cooling channel by means of a (additional) tubing, which also represents a fluid channel and is in particular arranged outside the drive housing. The channel can comprise two (not intersecting) passages, wherein one of the passages opens from the outside into the cooling channel and the second channel opens from the outside into the cavity, wherein the tubing connects the two passages (e.g. outside of the housing) to one another.

According to a further development, the insert can be manufactured by means of sheet reshaping, die casting, or extrusion pressing. Thus, the insert is simple and inexpensive to manufacture.

According to a further development, the insert can be joined to the drive housing (sealingly) by means of gluing (insert glued), welding (insert welded) and/or pressing (insert pressed). An additional seal can thus be omitted.

According to a further development, in the regions in which the insert contacts the drive housing, at least one (respective) seal can be arranged so as to seal the cavity against the (interior of) the drive housing(s). This can be realized by a seal injected onto the insert, for example an elastomeric seal (equivalent to a radial shaft sealing ring (RSSR)) or an O-ring.

According to a further development, the insert can have a round, in particular circular, disk-like shape with a round, in particular circular, opening (in the middle). The insert can have an outer edge region and an inner edge region. The outer edge region and/or the inner edge region can be (sealingly) joined to the drive housing. The outer edge region can be in contact with an inner peripheral surface of the drive housing, for example. The inner edge region can be in contact with a bearing seat or a sealing seat of the bearing wall, for example.

According to a further development, the cavity and the cooling channel can be fluidically connected in parallel. The parallel circuit here relates to a coolant flow or coolant flow channel.

According to a further development, the cavity and the cooling channel can be fluidically connected in series. The series circuit relates here to a coolant flow or coolant flow channel.

According to the invention, a vehicle, in particular a motor vehicle, is proposed having an electric drive unit according to the above embodiments. With respect to the advantages that can be achieved in this way, reference is made to the explanations regarding the electric drive unit. The measures described in connection with the electric drive unit can serve for the further configuration of the vehicle.

BRIEF DESCRIPTION OF THE DRAWINGS

An embodiment of the invention is explained below with reference to the accompanying drawings. The figures show.

DETAILED DESCRIPTION

Figure 1:
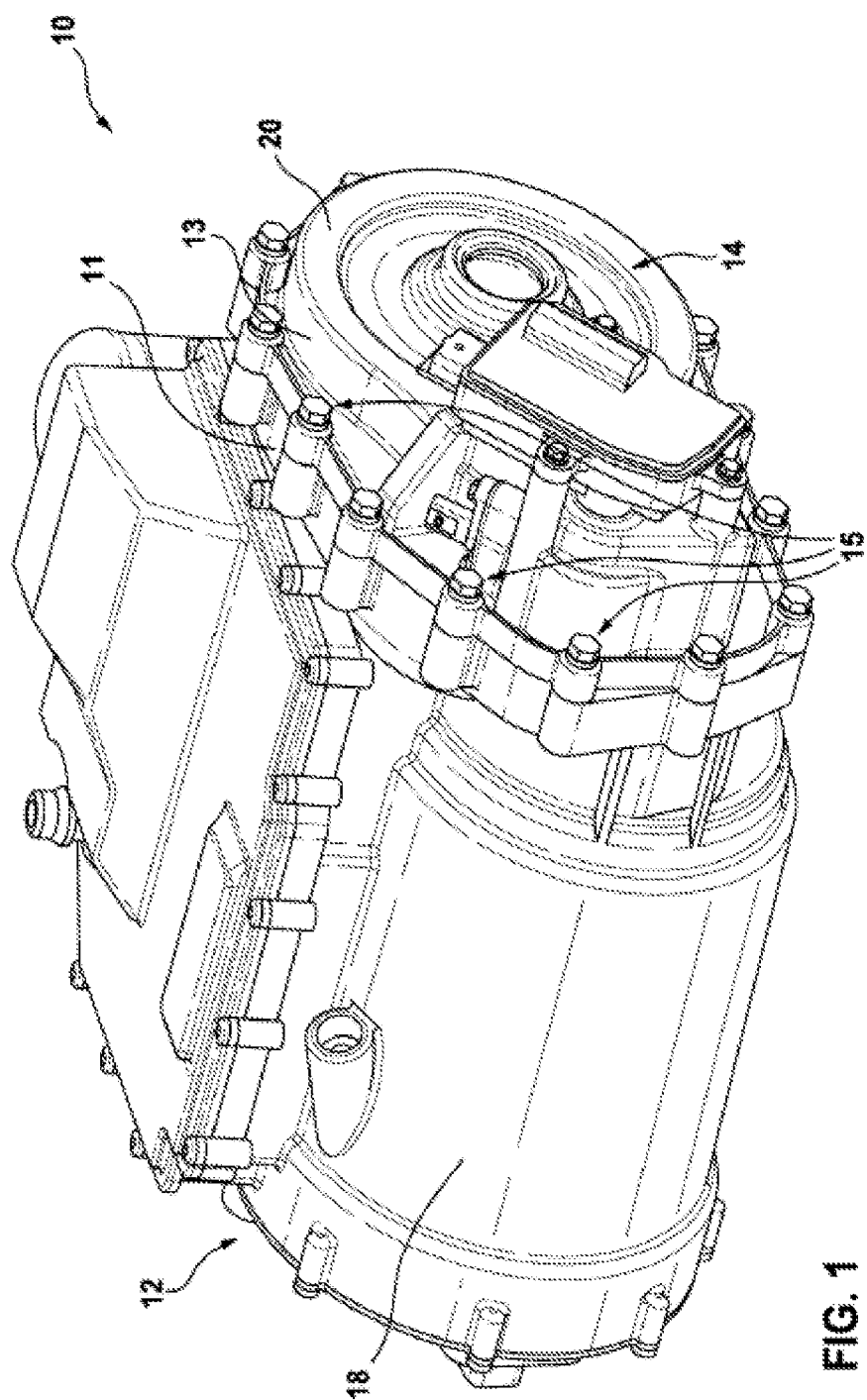
FIG. 1 a perspective view of an electric drive unit.

In FIG. 1, the electric drive unit bears the overall reference number 10. For example, the electric drive unit 10 can be configured as an eAxle or form part of an eAxle.

The electric drive unit comprises an electric machine 12 and a transmission 14. The electric machine 12 is accommodated in a drive housing 18 and the transmission 14 is accommodated in a transmission housing 20. In the present case, the transmission housing 20 is formed from two parts. The first part 11 of the transmission housing 20 is formed integrally with the drive housing 18. A second part 13 of the transmission 20 is connected (sealingly) to the first part 11 of the transmission 20 by means of screw 15.

Figure 2:
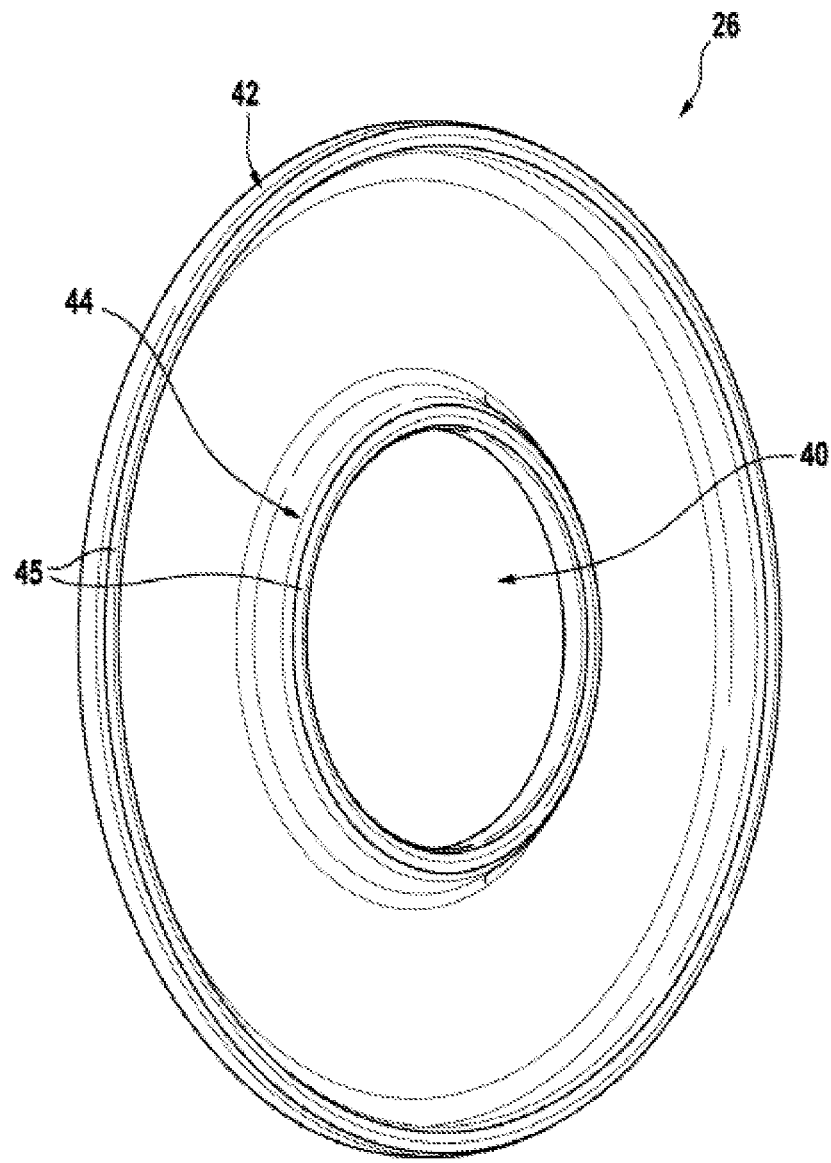
FIG. 2 a perspective view of an insert.

FIG. 2 shows a perspective view of an insert 26. The insert 26 can be manufactured by means of sheet reshaping, die casting, or extrusion pressing.

In the present case, the insert 26 has a circular disc-like shape with a circular opening 40 in the middle. The insert 26 has an outer edge region 42 and an inner edge region 44. In the present case, the outer edge region 42 and the inner edge region 44 each have a seal 45, by way of example. The seals 45 are arranged circumferentially on the inner and outer edge regions 42, 44, respectively.

Figure 3:
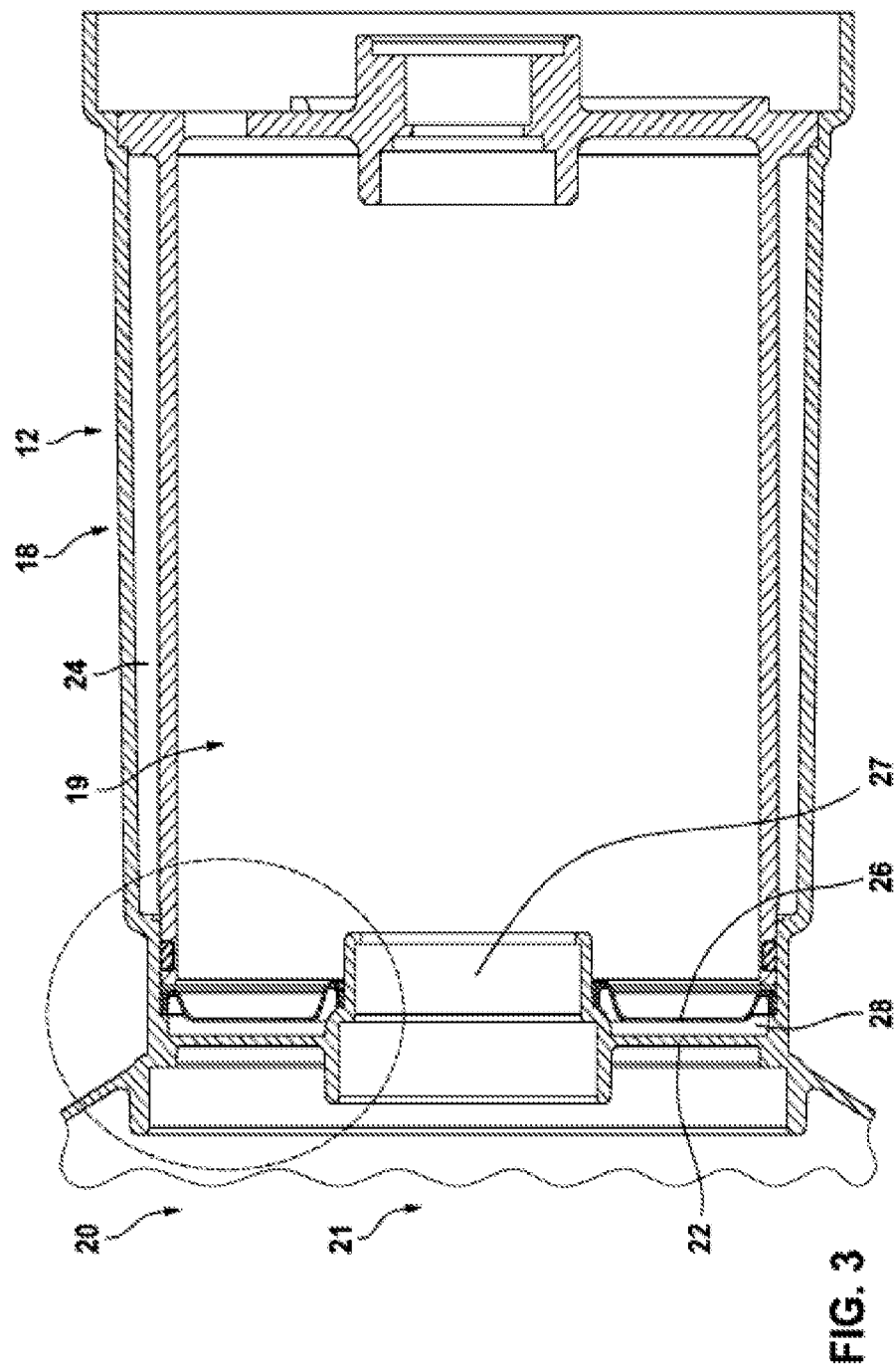
FIG. 3 an excerpt of a sectional view of a drive housing and a transmission housing.

FIG. 3 shows an excerpt of a sectional view of a drive housing 18 and a transmission housing 20. An interior 19 of the drive housing 18 and a partial interior 21 of the transmission housing 20 are depicted. The two interiors 19, 21 are separated by a bearing wall 22. Within the drive housing 18, a cooling channel 24 is provided in the form of a cooling jacket for cooling the electric machine 12. A bearing seat and/or sealing seat 27 is configured on the bearing wall 22 in order to receive a rolling bearing and/or a sealing ring, for example a radial shaft sealing ring (not shown).

The insert 26 is arranged in the drive housing 18. This is configured and arranged such that a cavity 28 is created in the drive housing 18 between the bearing wall 22 and the insert 26. The cavity 28 is fluidically connected to the cooling channel 24. In FIG. 3, this fluid connection is not shown for reasons of clarity.

In the present case, the insert 26 is configured such that the cavity 28 extends over the entire surface of the bearing wall 22 facing the drive housing 18 (radially outside of the bearing seat and/or sealing seat 27). This cools the entire bearing wall 22.

Figure 4:
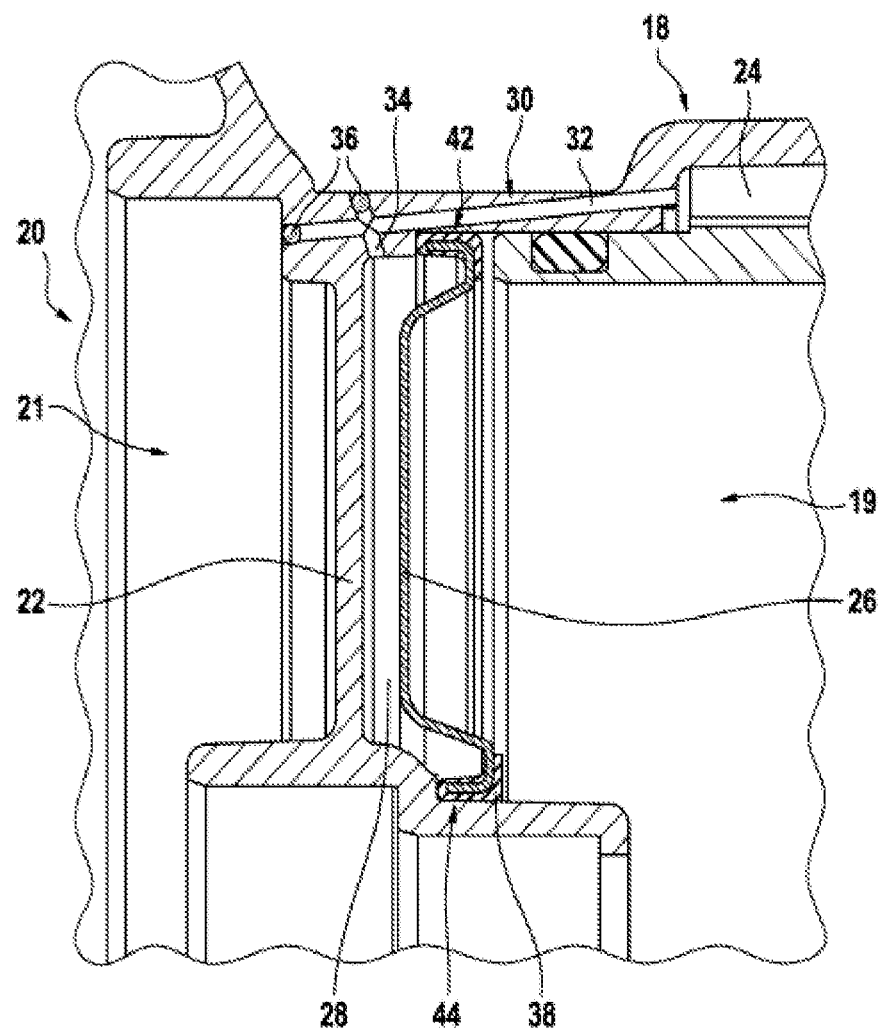
FIG. 4 an enlarged excerpt of a sectional view of the drive housing and the transmission housing according to FIG. 3.

FIG. 4 shows an enlarged excerpt of a sectional view of the drive housing 18 and the transmission housing 20 according to FIG. 3. The region marked in FIG. 3 with a dashed line is shown enlarged.

In the present case, the cavity 28 is fluidically connected to the cooling channel 24 by way of a channel 30. The channel 30 is formed by means of two intersecting passages 32, 34. A respective end of a passage 32, 34 is fluidically sealed/closed by means of a sealing plug 36. The cavity 28 thus becomes part of the cooling circuit and/or becomes a further cooling channel that cools the bearing wall 22. The passages 32, 34 can be produced in a simple and cost-effective manner by drilling/milling.

In the present case, the insert 26 contacts the drive housing 18 with its outer edge region 42 and its inner edge region 44. In the regions where the insert 26 contacts the drive housing 18, a seal 38 is arranged so as to seal the cavity 28 against the interior of the drive housing 18.

Figure 5:
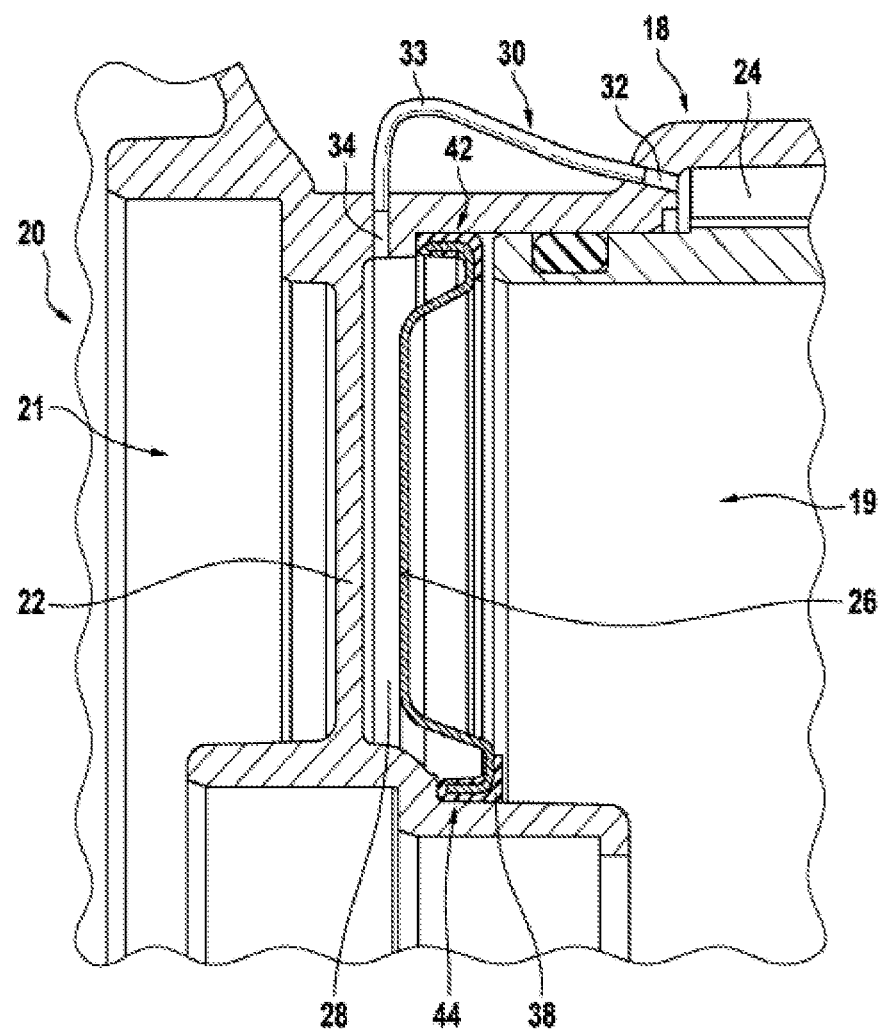
FIG. 5 a channel between a cooling channel of the drive housing and a cavity in an alternative embodiment to FIG. 4.

FIG. 5 shows the channel 30 between the cooling channel 24 of the drive housing 18 and the cavity 28 in an alternative embodiment to FIG. 4. By contrast to the embodiment example shown in FIG. 4, the passages 32, 34 do not intersect. No end of the passages 32, 34 is sealed with a sealing plug 36. The passage 32 leads from the cooling channel 24 to the outside of the drive housing 18. The passage 34 also leads from the cavity 28 to the outside of the drive housing 18. A tube connection 33 is provided outside the drive housing 18, which fluidically connects the two passages 32, 34 and thus the cavity 28 and the cooling channel 24 to one another.

Figure 6:
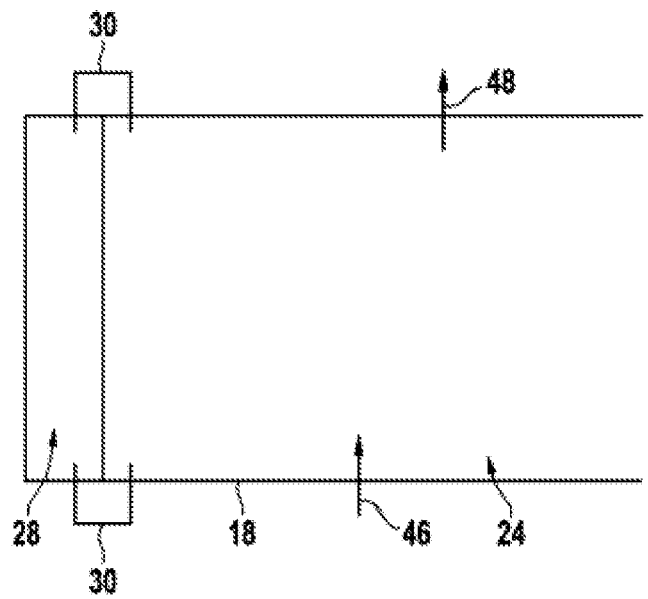
FIG. 6 a schematic diagram of a fluid parallel circuit.

FIG. 6 shows a schematic diagram of a fluid parallel circuit. Accordingly, the elements shown are only indicated schematically. A coolant is introduced into the coolant channel 24 of the drive housing 18 through an inlet opening 46. In the present case, the coolant channel 24 is configured as a cooling jacket. The coolant channel 24 is fluidically connected to the cavity 28 via two channels 30 (more than two channels 30 are also conceivable). Thus, the coolant from the coolant channel 24 enters the cavity 28 through the channels 30 and back out of the cavity 28 into the coolant channel 24. The coolant introduced through the inlet opening 46 therefore flushes through the coolant channel 24 and the cavity 28 before being discharged at an outlet opening 48, which is also fluidically connected to the coolant channel 24. Preferably, the inlet opening 46 and the outlet opening 48 are located on opposite sides of the drive housing 18. The coolant can be directed proportionally from the inlet opening 46 via the channel 30 (below in FIG. 6) and the channel 30 (above in FIG. 6) to the outlet opening 48.

Figure 7:
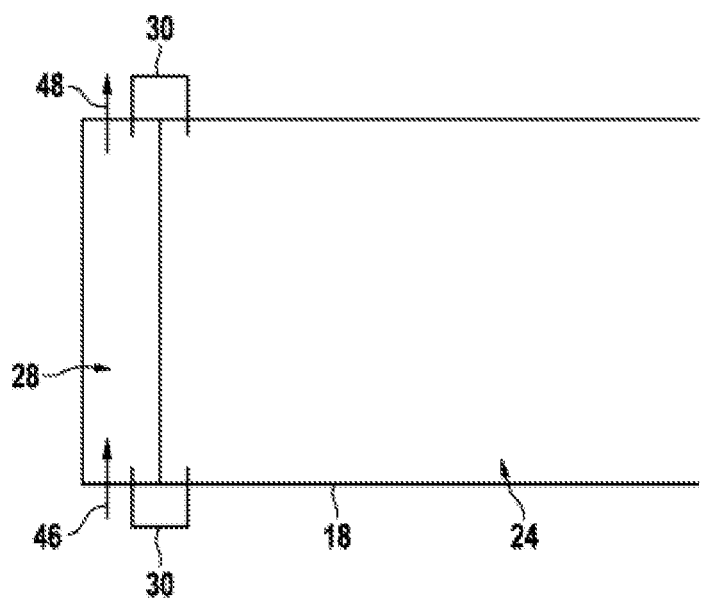
FIG. 7 a schematic diagram of a fluid parallel circuit alternative to FIG. 6.

FIG. 7 shows a schematic diagram of a fluid parallel circuit in an alternative to FIG. 6. Analogously to FIG. 6, the elements shown are only indicated schematically. By contrast to the embodiment example shown in FIG. 6, the inlet opening 46 and the outlet opening 48 each open into the cavity 28. The coolant introduced into the cavity 28 by the inlet opening 46 then also flushes through the cavity 28 and the coolant channel 24 before being discharged at the outlet opening 48. Again, the inlet opening 46 and the outlet opening 48 are preferably located on opposite sides of the drive housing 18.

Figure 8:
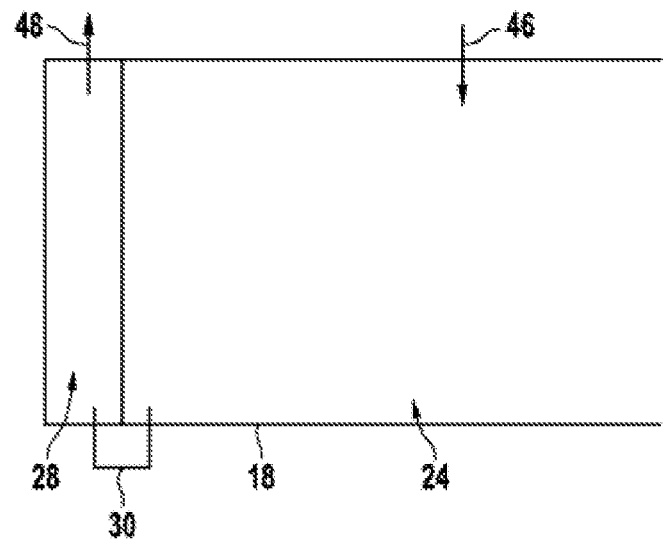
FIG. 8 a schematic diagram of a serial fluid circuit.

FIG. 8 shows a schematic diagram of a fluid serial circuit. Analogous to FIG. 6 and FIG. 7, the elements shown are merely indicated schematically. Here, the coolant is introduced through the inlet opening 46 into the coolant channel 24 of the drive housing 18 and discharged from the exit opening 48 arranged on the cavity 28. Analogously to FIGS. 6 and 7, the coolant channel 24 is configured as a cooling jacket. The coolant channel 24 is fluidically connected to the cavity 28 via the channel 30. Thus the coolant enters the coolant channel 24, flushes through it, enters the cavity 28 via the channel 30, flushes through it, and is discharged from the cavity 28 through the exit opening 48.

Figure 9:
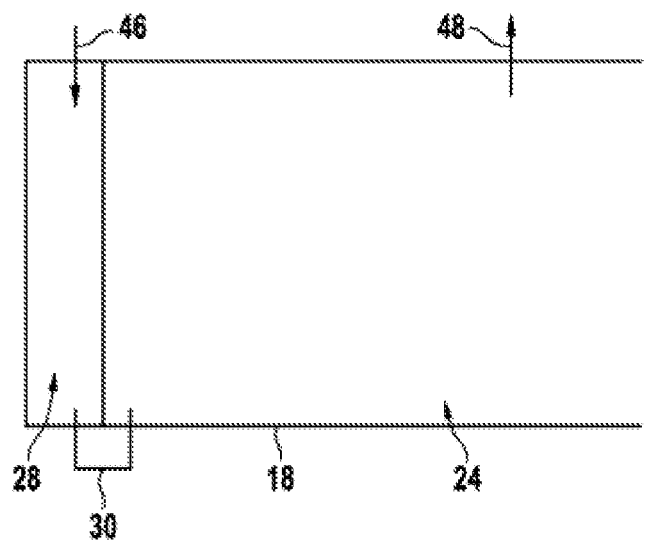
FIG. 9 a schematic diagram of a serial fluid circuit alternative to FIG. 8.

FIG. 9 shows a schematic diagram of a fluid serial circuit in an alternative to FIG. 8. Analogously to FIGS. 6 to 8, the elements shown are only indicated schematically. By contrast to the embodiment example shown in FIG. 8, the inlet opening 46 is arranged on the cavity 28 and the outlet opening 48 is arranged on the cooling channel 24. Thus, the coolant is introduced into the cavity 28 through the inlet opening 46. The cavity 28 is fluidically connected to the cooling channel 24 via the channel 30. Analogously to FIGS. 6 to 8, the coolant channel 24 is configured as a cooling jacket. Thus the coolant enters the cavity 28, flushes through it, enters the coolant channel 24 via the channel 30, flushes through it, and is discharged from the coolant channel 24 through the exit opening 48.

Preferably, in the embodiment examples shown in FIGS. 6 to 9, the outlet opening 48 is arranged at the top of the drive housing 18, such that the coolant does not pass through the outlet opening until the entire cavity 28 and/or coolant channel 24 has been flushed due to gravity.

The invention claimed is:

1. An electric drive unit (10) comprising an electric machine (12) and a transmission (14), wherein the electric machine (12) is accommodated in a drive housing (18), and the transmission (14) is accommodated in a transmission housing (20), wherein an interior (19) of the drive housing (18) and an interior (21) of the transmission housing (20) are separated by a bearing wall (22), and at least one cooling channel (24) for cooling the electric machine (12) is formed on or in the drive housing (18), wherein the electric drive unit (10) has an insert (26) which is configured and arranged such that a cavity (28) is produced in the drive housing (18) between the bearing wall (22) and the insert (26), and the cavity (28) is fluidically connected to the cooling channel (24).

2. The electric drive unit (10) according to claim 1, wherein the insert (26) is configured such that the cavity (28) extends over an entire surface of the bearing wall (22) facing the drive housing (18).

3. The electric drive unit (10) according to claim 1, wherein the cavity (28) is fluidically connected to the cooling channel (24) by at least one channel (30).

4. The electric drive unit (10) according to claim 3, wherein the channel (30) is formed by two intersecting passages (32, 34), and wherein a respective end of a passage (32, 34) is fluidically sealed/closed by a sealing plug (36).

5. An electric drive unit (10) according to claim 1, wherein the insert (26) is made by sheet metal reshaping, die casting, or extrusion pressing.

6. The electric drive unit (10) according to claim 1, wherein the insert (26) is joined to the drive housing (18) by gluing, welding, and/or pressing.

7. The electric drive unit (10) according to claim 1, wherein, in regions in which the insert (26) contacts the drive housing (18), at least one seal (38) is arranged so as to seal the cavity (28) against the drive housing (18).

8. The electric drive unit (10) according to claim 1, wherein the insert (26) has a round shape with a round opening (40), wherein the insert (26) has an outer edge region (42) and an inner edge region (44), wherein the outer edge region (42) and/or the inner edge region (44) are joined to the drive housing (18).

9. The electric drive unit (10) according to claim 8, wherein the insert (26) has a circular disk-like shape with a circular opening (40).

10. The electric drive unit (10) according to claim 1, wherein the cavity (28) and the cooling channel (24) are fluidically connected in parallel to one another.

11. The electric drive unit (10) according to claim 1, wherein the cavity (28) and the cooling channel (24) are fluidically connected in series.

12. A vehicle having an electric drive unit (10) according to claim 1.

13. The electric drive unit (10) according to claim 1, wherein the electric drive unit is for a vehicle or motor vehicle.

* * * * *